United States Patent [19]

Schapira et al.

[11] Patent Number: 4,843,119
[45] Date of Patent: Jun. 27, 1989

[54] ADHESIVE PRODUCT FOR THE BONDING OF STEEL, PARTICULARLY IN THE AUTOMOTIVE SHEETWORK OPERATIONS

[75] Inventors: Joseph Schapira, Paris; Paul Louis-Gavet, Montlignon; Pierre Maillard, Paris, all of France

[73] Assignee: Compagnie Francaise de Produits Industriels, Gennevilliers, France

[21] Appl. No.: 146,925

[22] Filed: Jan. 22, 1988

[30] Foreign Application Priority Data

Jan. 22, 1987 [FR] France ................................ 87 00727

[51] Int. Cl.$^4$ ............................................. C08L 75/04
[52] U.S. Cl. .................................... 524/730; 524/783; 525/453; 525/454; 525/460; 528/73; 528/76; 528/77
[58] Field of Search ....................... 525/453, 454, 460; 524/730, 783; 528/73, 76, 77

[56] References Cited

U.S. PATENT DOCUMENTS 3,510,439  5/1970  Kaltenbach et al. ............... 525/453

FOREIGN PATENT DOCUMENTS 0083233  7/1983  European Pat. Off. .
0143120  6/1985  European Pat. Off. .

Primary Examiner—Maurice J. Welsh
Attorney, Agent, or Firm—Fleit, Jacobson, Cohn, Price, Holman & Stern

[57] ABSTRACT

Adhesive product for the bonding of steel, particularly in the automotive sheetwork processes proper to be used on ordinary non-degreased or oiled steel as well as on precoated steels of the electroplated or electrotinned type, even after being regreased, the said adhesive product being polyurethane-based and implementing polyol systems, comprising either one poylol or binary or ternary polyol mixtures or mixtures of more than three polyols modified by reaction with an epoxy resin.

13 Claims, No Drawings

ADHESIVE PRODUCT FOR THE BONDING OF STEEL, PARTICULARLY IN THE AUTOMOTIVE SHEETWORK OPERATIONS

This invention relates to an adhesive product intended for the bonding of steel, particularly in the automotive sheetwork operations, such as steel cladding, fitting and trimming.

In the automotive industry, it is known to resort to epoxy adhesives in order to bond together metal surfaces which may be coated or soiled with grease.

The bonding or binding strength thus obtained, as determined on standard test pieces or specimens in accordance with the Manufacturers' testing method Nr. 1108—junction of two sheet metal plates by means of the adhesive (glued joint: 25 mm×20 mm×0.2 mm) and measurement of the force required in order to part them by pulling efforts exerted in the plane of the sheet metal plates, whereby the mode of rupture, i.e. parting, may be "cohesive", "adhesive" or "combined cohesive-adhesive", it being understood that "cohesive parting" is soughtafter—is higher than 8 MPa.

The drawback encountered with epoxy adhesive bonding lies especially in the fact that, on the one hand, in the lapse of time between the application of the adhesive and the arrival of the bonded parts in the surface treatment area of the assembly line, i.e. for a time duration of about 2 to 4 hours, the epoxy adhesive does not have any adherence properties, the relative shifting or dislocations of parts one relative to the other thus remaining possible and, on the other hand, in the surface treatment areas, the baths implemented bring about a carryover of the "unbaked" adhesive, whereby resulting in contamination and weakening of the glued joint.

It has been proposed to remedy these drawbacks by providing a resin prebaking process, the disadvantage of which is an expensive and difficult implementation.

The object of the present invention is therefore to provide an adhesive product of the aforesaid type, which better meets the various requisites of the technique than the ones already available.

It is to the credit of the Applicant to have found at the outcome of thorough research that this object could be reached by means of a polyurethane-based adhesive substance, either in the form of a two-component system, or as a one-component system with blocked hardening agent.

The adhesive product according to this invention for the bonding of steel, particularly in the automotive sheetwork processes is polyurethane-based, implementing polyol systems, comprising either one polyol or binary or ternary polyol mixtures or mixtures of more than three polyols modified by reaction with an epoxy resin.

The adhesive products according to the invention provide a bonding strength in the order of 1 to 2 MPa when entering the surface treatment area, without any previous baking.

The epoxy resin may be an epoxy resin available in the market, e.g. the one known under the "EPIKOTE 828" trademark and sold by Shell.

The polyols incorporated in the systems, especially in the binary and ternary systems of modified polyols may be polyether polyols or polyester polyols or also mixed polyols.

They are identified by their hydroxyl number.

The following polyols have been tested:

polyether polyols having hydroxyl numbers from 34 to 360, especially of 34, 26, 25 and 360 (all of them being branched triols), polyester polyols having hydroxyl numbers from 40 to 215, especially of respectively 40 (linear), 56 (linear), 60 (slightly branched), 170 (half-branched), 160 (branched), 215 (branched), mixed polyol having a hydroxyl number from 120 to 200, especially of 160–170 (branched).

The shear resistances of the adhesive products embodied by the invention, based on the polyurethanes obtained by means of the following three binary mixtures of modified polyols are given hereunder by way of example, it being understood that the composition of the polyurethanes comprises diisocyanate as known in the art.

The three binary mixtures are as follows:
(a) 50% of diol having a molecular mass of 1000 and 50% of triol having a molecular mass of 450,
(b) 65% of polyether diol having a molecular mass of 1000 and 35% of polyether diol having a molecular mass of 450,
(c) 66.6% of polyether diol having a molecular mass of 400 and 33.3% of a triol having a molecular mass of 400.

The shear resistances determined by the aforesaid test are as follows:

on degreased steel, 18 MPa, 8.8 MPa and 20.6 MPa for (a), (b) and (c) respectively, the parting being cohesive, on oiled steel, 6.9 MPa, 8.3 MPa and 20.4 MPa for (a), (b) and (c) respectively, the parting being cohesive for (b), and mixed for (a) and (c).

The values of the shear resistance obtained with the adhesive products based on the two ternary mixtures (d) and (e) of the following modified polyols are indicated further below:
(d) 50% of diol having a molecular mass of 1000
25% of diol having a molecular mass of 400
25% of triol having a molecular mass of 400
(e) 50% of diol having a molecular mass of 1000
15% of diol having a molecular mass of 400
25% of triol having a molecular mass of 400.

The shear resistances are as follows:

on degreased steel, 13.7 MPa for (d) and 17.8 MPa for (e) with cohesive parting, on oiled steel, 13.3 MPa for (d) and 18 MPa for (e) with mixed parting in the first case and cohesive parting in the second one.

The ageing stability of the adhesive products embodied by this invention are in the whole satisfactory.

With a view to enhancing it still further, there can, according to the invention, either be acted on the technique relating to the modification of the polyols contained in the constitution of the adhesive products of the invention, or there can be added a low amount of suitable additives to said adhesive products.

In the first case, it is a matter of properly selecting the conditions of temperature and time of the reaction of modification, whereby it should remain understood that, generally, 0.5 to 4 moles of polyol are reacted with about 1 mole of epoxy resin and more particularly about 2 moles of polyol are reacted with about 1 mole of epoxy resin.

Good results could be achieved by selecting the temperature in the range of 130 to 200° C. and the reaction time in the interval of 3 to 24 hours.

By following such a procedure, the ageing stability can be improved (as measured by an accelerated ageing test) to such a point that the parting resistance after several years (e.g. 5 years) is doubled and the parting is improved.

In the second case, to the adhesive product is added an amount generally lower than 3% of an additive which can be selected from the silanes, alkyl titanates, ketonic resins, acrylic resins and others.

By way of example, it may be pointed out that:

among the silanes, have successfully been used those sold under the trademark "GLYMO", "MERCAPTO" and "DAMMO" by Dynamit Nobel and those sold under the designations "A 187", "A 189", "A 1120" and "A 1100" by Union Carbide, the amounts implemented being from 0.1 to 1 % by weight related to the mass of adhesive product;

among the ketonic resins, good results could be achieved with the resin SK sold by Huls and the resin sold under the trademark "MACRYNAL" by Hoechst, the amount being from 1 to 2%;

among the acrylic resins, good results could be achieved with the resin "DESMOPHEN A" sold by Bayer, used in the amount of 1 to 2%.

Here again, the parting resistance can be doubled after several years' ageing and the nature of the parting is improved.

Besides the base consisting of polyurethane, the additives in accordance with the invention may contain (expressed in weight percent related to the mass of adhesive product)

fillers (10 to 55%) consisting e.g. of $CO_3Ca$, kaolin and others, plasticizers (2 to 10%) of the phthalate-type, catalysts of the tin salt-type, solvents (0.1 to 20%) in order to control the viscosity, such as xylene, thickening agents (0.1 to 5%) such as silica derivates, pigments (0.1 to 15%) such as titania or titanium (IV) oxide and carbon blacks.

The additives according to this invention make it possible to bond not only ordinary non-degreased or oiled steel, but also pre-coated steels of the electroplated or electrotinned type, even after being regreased.

We claim:

1. An adhesive product comprising a polyurethane produced by reacting an epoxy resin with a polyol compound selected from the group consisting of polyether polyols, polyester polyols, mixed polyols, binary mixtures and ternary mixtures of diols and triols, to produce a modified polyol; and then reacting the modified polyol with a diisocyanate to produce the polyurethane.

2. Adhesive product according to claim 1, wherein the epoxy resin is the epoxy resin sold by Shell under the trademark EPIKOTE 828.

3. Adhesive product according to claim 1, wherein the polyol compound is selected from the group consisting of polyether polyols having hydroxyl numbers from 34 to 360.

4. Adhesive product according to claim 1, wherein the polyol compound is selected from the group consisting of polyether polyols which are branched triols having as hydroxyl numbers 34, 26, 25 and 360.

5. Adhesive product according to claim 1, wherein the polyol compound is selected from the group consisting of polyester polyols having hydroxyl numbers from 40 to 215.

6. Adhesive product according to claim 1, wherein the polyol compound is selected from the group consisting of polyester polyols having as hydroxyl numbers 40 (linear), 56 (linear), 60 (slightly branched), 170 (half-branched), 160 (branched), and 215 (branched).

7. Adhesive product according to claim 1, wherein the polyol compound is selected from the group consisting of mixed polyols which are branched and have a hydroxyl number from 120 to 200.

8. Adhesive product according to claim 1, wherein the polyol compound is selected from the group consisting of mixed polyols which are branched and have a hydroxyl number from 160-170.

9. Adhesive product according to claim 1, wherein the polyol compound is a binary mixture of diols and triols selected from the group consisting of
   (a) 50% of diol having a molecular mass of 1000 and 50% of triol having a molecular mass of 450,
   (b) 65% of polyether diol having a molecular mass of 1000 and 35% of polyether diol having a molecular mass of 450,
   (c) 66.6% of polyether diol having a molecular mass of 400 and 33.3% of a triol having a molecular mass of 400.

10. Adhesive product according to claim 1, wherein the polyol compound is a ternary mixture of diols and triols selected from the group consisting of
    (d) 50% of diol having a molecular mass of 1000
        25% of diol having a molecular mass of 400
        25% of triol having a molecular mass of 400
    (e) 50% of diol having a molecular mass of 1000
        15% of diol having a molecular mass of 400
        25% of triol having a molecular mass of 400.

11. Adhesive product according to claim 1, wherein the modified polyol is produced by reacting about 1 mole of epoxy resin with 0.5 to 4 moles of polyol compound.

12. Adhesive product according to claim 1, further comprising less than 3% of an additive selected from the group consisting of silanes, alkyl titanates, ketonic resins and acrylic resins.

13. Adhesive product according to claim 1, further comprising
    10 to 55% of a filler selected from the group consisting of $Co_3Ca$ and kaolin,
    2 to 10% of a plasticizer of the phthalate-type,
    catalysts of the tin salt-type,
    0.1 to 20% of a solvent,
    0.1 to 5% of a thickening agent,
    0.1 to 15% of a pigment selected from the group consisting of titanium (IV) oxide and carbon blacks.

* * * * *